Figure 1:
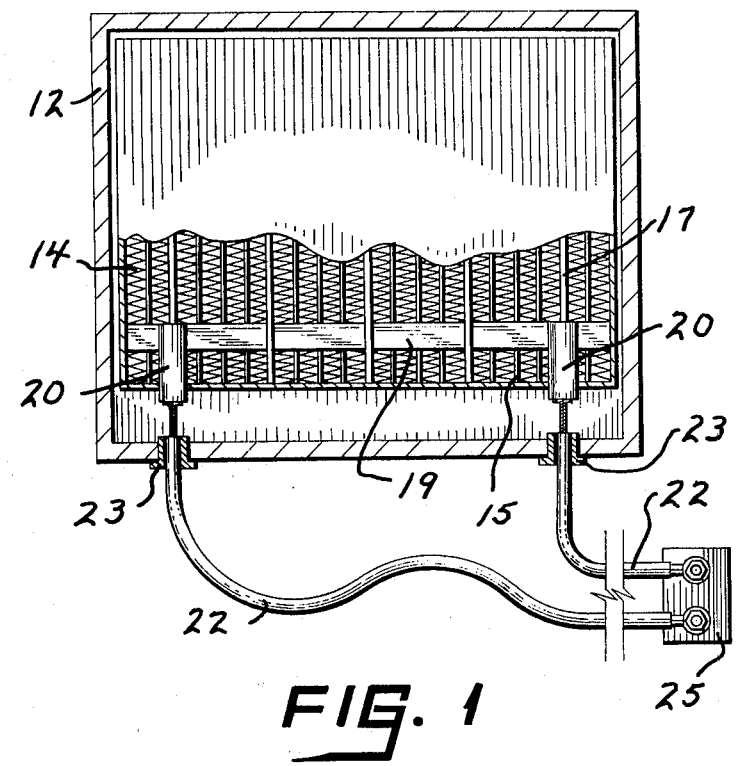

United States Patent [19]
Beck, Jr.

[11] 4,331,749
[45] May 25, 1982

[54] STORAGE BATTERY STRUCTURE
[76] Inventor: Doyle Beck, Jr., 1021 N. Ann St., Boonville, Ind. 47601
[21] Appl. No.: 207,008
[22] Filed: Nov. 14, 1980
[51] Int. Cl.³ ............................................ H01M 2/02
[52] U.S. Cl. ...................................... 429/179; 429/185
[58] Field of Search ................................ 429/179–185, 429/160, 174, 161

[56] References Cited
U.S. PATENT DOCUMENTS

| 3,309,235 | 3/1967 | Teeple, Sr. | 429/179 X |
| 3,605,065 | 9/1971 | Shannon | 429/179 X |
| 3,937,636 | 2/1976 | Slautterback | 429/179 X |
| 4,143,215 | 3/1979 | Mocas | 429/179 |
| 4,154,907 | 5/1979 | Crow | 429/179 |
| 4,207,390 | 6/1980 | Oehrlein | 429/179 |

Primary Examiner—Charles F. LeFevour
Attorney, Agent, or Firm—Warren D. Flackbert

[57] ABSTRACT

A storage battery characterized by a housing fabricated from a plastic resin and having plastic encased electrical conductors extending from a wall thereof in a manner which eliminates the necessity of having the customary battery terminals on the upper surface of the unit. The preceding relationship eliminates corrosion and shorting, serving for safety by providing a direct contact between the battery plates and a junction box and, at the same time, presenting a weatherproof arrangement.

2 Claims, 2 Drawing Figures

U.S. Patent May 25, 1982 4,331,749

STORAGE BATTERY STRUCTURE

As is known, the conventional storage battery commonly used in vehicles for starting purposes includes terminals on the upper surface thereof. A primary drawback of the presently available automotive battery, however, is that of the corrosion of the terminals or posts, such serving to break down the electrical contact. In order to have an efficient power source, it is important that the battery posts are clean, as through the use of a battery terminal cleaning brush together with a battery post cleaner. In order to maintain clean battery posts, the owner oftentimes uses a lubricant and may even purchase protectors which fit onto such.

In any event, the invention overcomes the troublesome aspects described above in connection with customary batteries. The advantages of the invention are accomplished through the elimination of the battery terminals, where, instead, electrical contacts are directly secured to the plate strap disposed within the battery, with flexible electrical conductors extending outwardly from a side of the battery to a conventional junction box. The battery casing is fabricated from a plastic resin, and the electrical conductors outside of the casing are plastic covered, where a grommet or like sealing member is provided at the openings in the casing to achieve a completely weathertight installation.

In other words, with the elimination of the battery posts or terminals, the aforesaid corrosive effect is absent and the maintenance problems are considerably reduced. Moreover, the possibility of shorting is absent, as is the chance of blow-up in the instance of jump cables. As a result, the battery structure of the invention affords extended life and, hence, a reliable power source for any intended use.

Figure 2:
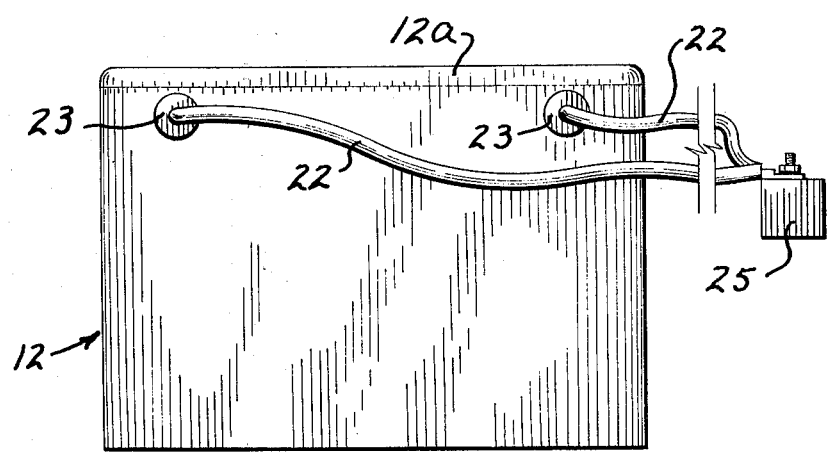

In any event, a better understanding of the present invention will become more apparent from the following description, taken in conjunction with the accompanying drawing, wherein FIG. 1 is a top plan view, partly fragmentary and partly in horizontal section, showing a storage battery structure in accordance with the teachings of the present invention; and, FIG. 2 is a view in side elevation of the structure of FIG. 1, looking upwardly at such figure from the bottom thereof.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the storage battery structure of the invention includes a housing or casing 12 fabricated from a plastic resin and containing, in the usual manner, a series of alternately negative and positive plates 14. The assembly further includes plate separators 15 and cell partitions 17, where a plate strap 19 extends over the plates 14. As particularly evident in FIG. 2, the battery structure also includes a one piece cover 12a for the housing or casing 12, such being flat and not including, in accordance with the teachings of the invention, any upstanding battery terminals or posts.

In contrast, electrical contacts 20, at the end of conductors 22, engage the aforesaid plate strap 19, where the conductors 22 extend through openings in a side wall 12b of the casing or housing 12. The conductors 22 are flexible, perhaps 8" in length, being contained within plastic and, typically, terminate at a junction box 25, the latter being grounded to the vehicle frame. In order to assure a weatherproof assembled unit, grommets 23 or like sealing means are received in the openings through which the conductors 22 pass from the inside of the battery structure.

In other words, the invention importantly eliminates the necessity of terminals or posts customarily found on the upper surface of a battery, obviating, therefore, any corrosive effect and, as well, the need for selective maintenance. The battery structure of the invention presents a weatherproof unit and one which dependably offers a continual source of power.

From the preceding, it should be evident that the invention affords a new concept for a storage battery, realistically channeling the power generated through plastic encased flexible conductors 22, with the result being a simplified unit virtually eliminating maintenance problems. The arrangement overcomes corrosion and shorting commonly inherent in current batteries, in that the flexible conductors 22 are directly secured to the plates 14, at contacts 20-plate strap 19. Moreover, the invention further eliminates the possibility of blow-up in the instance of jump cables.

The storage battery structure described hereabove is susceptible to various changes within the spirit of the invention, as, for example, in proportioning; in the exit locations for the electrical conductors; the particular type of plastic resin employed; and, the like. Thus, the preceding should be considered illustrative and not as limiting the scope of the following claims:

I claim:

1. An electrical storage battery structure comprising a casing, plates disposed within said casing, and conductors having ends within said casing in electrical contact with said plates and directly extending through a side wall in said casing to a terminal remote from said casing, where said casing is fabricated from a plastic resin and said conductors are encased within plastic resin in a weathertight and non-electrical relationship with respect to said side wall and said casing.

2. The electrical storage battery of claim 1 where auxiliary sealing means are disposed in openings through which said conductors pass from said casing.

* * * * *